Patented Mar. 26, 1935

1,996,032

UNITED STATES PATENT OFFICE 1,996,032

SOUND ABSORBING COMPOSITION

Carlisle K. Roos, Wheaton, Ill., assignor to United States Gypsum Company, Chicago, Ill., a corporation of Illinois No Drawing. Application April 15, 1929, Serial No. 355,427. Renewed October 4, 1934

9 Claims. (Cl. 106—36)

This invention relates to sound absorbing materials and has reference more particularly to a sound absorbing composition having as a base a fibrous material such as mineral wool.

Various fibrous materials have been suggested for use on the walls of rooms when it is desired to reduce reverberation and resonance within a chamber. These are largely of the organic type, such as wood, vegetable and hair fibres. In building construction mineral wool is to be preferred as, unlike organic fibres it is non-combustible, vermin-proof and not subject to decay. However, mineral wool is difficult to apply successfully to walls unless properly compound with suitable ingredients. When used as a major ingredient in a composition, it may be applied to walls in the form of a paint, a plaster or moulded tile.

An object of this invention therefore, is to provide a sound absorbing composition having a fibrous material as a base, said composition being suitable for use as a paint, a plaster or a tile.

Another object of this invention is to provide a sound absorbing composition for the formation of a sound absorbing tile in which the sound absorption properties of the mineral wool are improved.

A further object of the invention is to provide a sound absorbing composition in which mineral wool is the base material and a treatment which insures the property of moldability of the resulting composition for the formation of tile; also to improve sound absorbing materials, and their architectural beauty.

As a fibrous base for my improved composition, I prefer mineral wool because of its high sound absorbing qualities, its non-combustible and vermin-proof nature, and its characteristic of producing a structure of masonry like appearance with my treatment. It should be understood however, that other fibrous materials may be substituted as a whole or in part, such as wood or other cellulose fibers or other light weight fibrous material may be used as a base for my composition.

The other ingredients in my composition are a binder such as animal glue, a gel forming substance such as cooked starch a ground mineral filler such as asbestine, talc, or pyrophyllite to reduce the combustibility of the binder, an antiseptic such as beta naphthol, zinc sulfate or borax and a fixative or hardening agent such as aluminum sulfate to harden and fix the glue binder.

The gel forming substance, such as cooked starch, has important functions in my composition in that it improves the moldability or workability of the plastic composition when mixed with water. It suspends the fibers and provides mobility to the mass so that the acoustical tile may be moulded with ease, or the material may be readily spread upon a wall as a plastic paint finish or as a plaster. The gel forming substance also has a property of holding large quantities of water in the composition without imparting excessive fluidity thereto. When this water dries out of the resulting product, voids or pores are left where the water formerly existed, leaving a porous structure of mineral wool cemented together with glue binder, so that a porous, rigid structure results having sound absorption properties materially improved thereby. The cooked starch shrinks with drying and also serves as a binding agent.

The addition of a small amount of fine ground pyrophyllite is sufficient to reduce the combustibility of the organic binders so that the product will not continue to smolder after it has been in contact with a flame but this filler addition does not appreciably lower the sound absorption coefficient of the material.

In its ordinary state without the addition of pigment my composition is a light greenish white. To it may be added small quantities of ordinary paint pigments such as yellow ochre, red iron oxide, umber, etc. to obtain various mottled decorative effects.

The preferred formula of my composition is as follows:

| | |
|---|---|
| Mineral wool | 85½ pounds |
| Glue | 2 pounds |
| Starch | 9 pounds |
| Pyrophyllite | 2½ pounds |
| Beta naphthol | ½ ounce |
| Aluminum sulfate | 2 ounces |

In preparing this composition the cooked starch is prepared by adding it to 22 gal. of cold water and heating to approx. 200 deg. F. and allowing it to gel. The glue is soaked about 12 hours in two gallons of water to distend and dissolve it. The two solutions are then combined, the beta naphthol and aluminum sulfate predissolved in warm water are added together with mineral wool and pyrophyllite and incorporated with the mass. The mixture is then placed in a moderate speed multiple blade mixer and thoroughly mixed. The time element and operation of the mixer is very important. Unlike most fibers, mineral wool is of brittle nature and is non-wilting and not softened by water so that in the mixing operation a part of the fiber is reduced in length. By varying the mixing time or the speed of agitation it is possible to easily alter the fiber length, so that the porosity and appearance of the product may be varied at will, and thereby its sound absorption coefficient. More or less water may be added to bring the mixture to the desired consistency. Pigments may be incorporated with gel and the whole blended together. It is to be understood that the filler, preservative and fixative desirable in many instances but may be omitted if desired and still give a composition of excellent qualities.

If sound absorbing tile are to be made, the composition is preferably spread upon a coarse open mesh burlap placed in a metal mould having a perforated bottom, the top screeded smooth, and the whole dried in a kiln where the moisture content of the tile is reduced to the desired point. After drying, the tile is removed from the mold and the pores at the back of the tile are opened up by stripping off the burlap, or other cloth coating, which removes a light surface skin formed during the drying process. The tile then may be trimmed, trued up, beveled and worked in a fashion similar to wood. Any face whose porosity has not been opened up in the fabric stripping operation may be removed by a sanding roll or similar device. The resultant tile usually made in thickness of ½ inch to 1 inch, is of light weight, (about ¾ lb. to 1½ lb. per square foot) rigid and of such porosity that it readily affords passage for air blown through it at low pressure. Its porous, artificial, stone-like surface produces a pleasing effect. These titles are attached to wall and ceiling surfaces by the means of adhesives such as linoleum cement and casein glue preparations, either directly to the surface or in conjunction with furring strips.

My composition is intended for decorative treatment of offices, auditoriums, corridors, etc., to control the acoustical characteristics of such rooms. Its connected porosity is such that a portion of the compressions and rarefactions of the sound waves are kinetically converted to heat energy.

By dry mixing of the component ingredients to a degree where the mineral wool fibers are shortened and increasing the fluidity of the mass slightly, I may apply it as a plastic finish with either brush or trowel.

I would state in conclusion that while the example described constitutes a practical embodiment of my invention I do not wish to limit myself precisely to these details since, manifestly, the same can be considerably varied without departing from the spirit of the invention as defined in the appended claims.

Having thus described my invention, I claim as new and desire to secure by Letters Patent:—

1. A sound absorbing composition having the following ingredients in substantially the proportions named:

| | |
|---|---|
| Mineral wool | 85½ pounds |
| Glue | 2 pounds |
| Cooked starch | 9 pounds |
| Pyrophyllite | 2½ pounds |
| Beta naphthol | ½ ounce |
| Aluminum sulfate | 2 ounces |

2. A composition that on drying forms a porous sound-entrapping surface and which is characterized by connected porosity from the surface through the entire composition which comprises a major portion of mineral wool, glue, a gelatinous starch paste, a pulverulent mineral filler, and a hardening agent for the glue.

3. A composition that on drying forms a porous sound-entrapping surface and which is characterized by connected porosity from the surface through the entire composition which comprises mineral wool, glue, a gelatinous starch paste, a pulverulent mineral filler, and aluminum sulphate.

4. A composition that on drying forms a porous, sound-entrapping surface, and which is characterized by structural rigidity and connected porosity from the surface through the entire composition, which comprises a major portion of mineral wool, gelatinized starch binder and a mineral filler.

5. An acoustical composition of stone-like appearance and structural rigidity, characterized by connected porosity from the surface through the entire composition, comprising a major portion of mineral wool, dried starchy binding material, a mineral filler, a preservative, and a pigment.

6. An acoustical composition of stone-like appearance and structural rigidity, characterized by connected porosity from the surface through the entire composition, comprising a major portion of mineral wool, dried starchy binding material, and a mineral filler.

7. An acoustical composition of stone-like appearance and structural rigidity, characterized by connected porosity from the surface through the entire composition, comprising a major portion of mineral wool, and a binder therefor capable of cementing said mineral wool together and in an amount sufficient to do so without impairing the connected porosity of the composition.

8. An acoustical composition of stone-like appearance and structural rigidity, characterized by connected porosity from the surface through the entire composition, comprising a major portion of mineral wool, glue, a dried starchy paste, a pulverulent mineral filler, and a hardening agent for the glue.

9. An acoustical composition of stone-like appearance and structural rigidity, characterized by connected porosity from the surface through the entire composition, comprising a major portion of mineral wool, glue, a dried starchy paste, a pulverulent mineral filler, and aluminum sulphate.

CARLISLE K. ROOS.